(12) United States Patent
Hardå et al.

(10) Patent No.: US 12,472,990 B2
(45) Date of Patent: Nov. 18, 2025

(54) TRANSITIONING TO AN UNSUPERVISED AUTONOMOUS DRIVING MODE OF AN ADS

(71) Applicant: Zenseact AB, Gothenburg (SE)

(72) Inventors: Peter Hardå, Torslanda (SE); Mattias Brännström, Gothenburg (SE)

(73) Assignee: Zenseact AB, Gothenburg (SE)

( * ) Notice: Subject to any disclaimer, the term of this patent is extended or adjusted under 35 U.S.C. 154(b) by 497 days.

(21) Appl. No.: 17/976,986

(22) Filed: Oct. 31, 2022

(65) Prior Publication Data

US 2023/0133341 A1    May 4, 2023

(30) Foreign Application Priority Data

Nov. 1, 2021 (EP) .................................... 21205751

(51) Int. Cl.
  *B60W 60/00* (2020.01)
  *B60W 30/182* (2020.01)
  (Continued)

(52) U.S. Cl.
  CPC ........ *B60W 60/005* (2020.02); *B60W 30/182* (2013.01); *B60W 40/02* (2013.01);
  (Continued)

(58) Field of Classification Search
  CPC .... B60W 60/05; B60W 30/182; B60W 40/02; B60W 40/105; B60W 50/082; B60W 50/14; B60W 2050/143; B60W 2050/146
  (Continued)

(56) References Cited

U.S. PATENT DOCUMENTS

| | | | | |
|---|---|---|---|---|
| 2020/0062278 | A1* | 2/2020 | Kuenzner | B60K 35/28 |
| 2021/0237762 | A1* | 8/2021 | Kuenzner | B60K 35/10 |
| 2021/0370935 | A1* | 12/2021 | Kuenzner | B60W 30/16 |

FOREIGN PATENT DOCUMENTS

| | | |
|---|---|---|
| DE | 102013217552 A1 | 3/2015 |
| DE | 102018206423 A1 | 10/2019 |

OTHER PUBLICATIONS

EPO Extended European Search Report dated May 9, 2022 for European Patent Application No. EP 21205751.7 filed Nov. 1, 2021, consisting of 9-pages.

(Continued)

*Primary Examiner* — Yazan A Soofi
(74) *Attorney, Agent, or Firm* — Weisberg I.P. Law, P.A.

(57) ABSTRACT

A driving mode transitioning system and method for supporting transitioning to an unsupervised autonomous driving mode of an Automated Driving System, ADS, of a vehicle. The driving mode transitioning system obtains vehicle situational data indicating a state of vehicle surroundings along with position and heading of the vehicle; determines based on the obtained vehicle situational data, that unsupervised driving conditions of an unsupervised driving mode-related driving policy pertinent an unsupervised autonomous driving mode of the ADS, are complied with; determines that the ADS has active a supervised driving mode; implements the unsupervised driving mode-related driving policy to govern the supervised driving mode; and enables the unsupervised autonomous driving mode to be activated for the ADS, when positioning and/or velocity of the vehicle has reached compliance with unsupervised dynamic driving conditions of the unsupervised driving mode-related driving policy.

18 Claims, 3 Drawing Sheets

(51) Int. Cl.
 B60W 40/02 (2006.01)
 B60W 40/105 (2012.01)
 B60W 50/08 (2020.01)
 B60W 50/14 (2020.01)
(52) U.S. Cl.
 CPC ........ *B60W 40/105* (2013.01); *B60W 50/082* (2013.01); *B60W 50/14* (2013.01); *B60W 2050/143* (2013.01); *B60W 2050/146* (2013.01)
(58) Field of Classification Search
 USPC .......................................................... 701/23
 See application file for complete search history.

(56) References Cited

OTHER PUBLICATIONS

Juwon Kim et al.; A vehicular positioning with GPS/IMU using adaptive control of filter noise covariance; ICT Express, vol. 2, No. 1; Mar. 1, 2016, consisting of 6-pages.

\* cited by examiner

TRANSITIONING TO AN UNSUPERVISED AUTONOMOUS DRIVING MODE OF AN ADS

CROSS REFERENCE TO RELATED APPLICATION

This application is related to and claims priority to European Patent Application No. EP 21205751.7, filed Nov. 1, 2021, entitled TRANSITIONING TO AN UNSUPERVISED AUTONOMOUS DRIVING MODE OF AN ADS the entirety of which is incorporated herein by reference.

TECHNICAL FIELD

The present disclosure relates to supporting transitioning to an unsupervised autonomous driving mode of an Automated Driving System, ADS, of a vehicle.

BACKGROUND

Within the automotive field, there has for quite some years been activity in development of autonomous vehicles. An increasing number of modern vehicles have advanced driver-assistance systems, ADAS, to increase vehicle safety and more generally road safety. ADAS—which for instance may be represented by collision avoidance system, forward collision warning, adaptive cruise control, lane keeping assistance, etc.—are electronic systems that may aid a vehicle driver while driving. Moreover, in a not-too-distant future, Autonomous Driving, AD, for instance as defined by the SAE J3016 levels (0-5) or (3-5) of driving automation, will to greater extent find its way into modern vehicles. AD along with ADAS will herein be referred to under the common term Automated Driving System, ADS, corresponding to all different levels of automation. An ADS may be construed as a complex combination of various components that can be defined as systems where perception, decision making, and operation of the vehicle—at least in part—are performed by electronics and machinery instead of a human driver. This may include handling of the vehicle, destination, as well as awareness of surroundings. While the automated system has control over the vehicle, it allows the human operator to leave all or at least some responsibilities to the system. To perceive its surroundings, an ADS commonly combines a variety of sensors, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

Activation of an unsupervised ADS driving feature e.g. an unsupervised autonomous driving mode—such as of SAE Levels 3 or 4—may for instance be offered in a manually controlled ADS-equipped vehicle, provided that said driving feature finds the conditions associated therewith fulfilled, such as operational design domain (ODD) conditions defined therefor being complied with. Some delay may be expected between the time when the driving feature is offered to a user e.g. driver of the vehicle, and the time when the user actually activates said driving feature. During this expected delay, one or more conditions for allowing activation of the driving feature may have ceased to be fulfilled; for instance, the driver may have increased vehicle speed too much and/or moved too close to the vehicle ahead. When such is the case, activation of the unsupervised ADS driving feature will be rejected albeit having been offered e.g. merely seconds ago, subsequently causing a situation which may displease and/or confuse the driver.

SUMMARY OF THE INVENTION

It is therefore an object of embodiments herein to provide an approach for in an improved and/or alternative manner support transitioning to an unsupervised autonomous driving mode of an ADS of a vehicle.

The object above may be achieved by the subject-matter disclosed herein. Embodiments are set forth in the appended claims, in the following description and in the drawings.

The disclosed subject-matter relates to a method performed by a driving mode transitioning system for supporting transitioning to an unsupervised autonomous driving mode of an ADS of a vehicle. The driving mode transitioning system obtains vehicle situational data indicating a state of vehicle surroundings along with position and heading of the vehicle. The driving mode transitioning system further determines based on the obtained vehicle situational data, that unsupervised driving conditions of an unsupervised driving mode-related driving policy pertinent an unsupervised autonomous driving mode of the ADS, are complied with. Moreover, the driving mode transitioning system determines that the ADS has active a supervised driving mode. The driving mode transitioning system further implements the unsupervised driving mode-related driving policy to govern the supervised driving mode. Furthermore, the driving mode transitioning system enables the unsupervised autonomous driving mode to be activated for the ADS, when positioning and/or velocity of the vehicle has reached compliance with unsupervised dynamic driving conditions of the unsupervised driving mode-related driving policy.

The disclosed subject-matter further relates to a driving mode transitioning system for—and/or adapted for—supporting transitioning to an unsupervised autonomous driving mode of an ADS of a vehicle. The driving mode transitioning system comprises a vehicle situational data obtaining unit for obtaining vehicle situational data indicating a state of vehicle surroundings along with position and heading of the vehicle. The driving mode transitioning system further comprises an unsupervised compliance determining unit for determining based on the obtained vehicle situational data, that unsupervised driving conditions of an unsupervised driving mode-related driving policy pertinent an unsupervised autonomous driving mode of the ADS, are complied with. Moreover, the driving mode transitioning system comprises a supervised mode determining unit for determining that the ADS has active a supervised driving mode. The driving mode transitioning system furthermore comprises an unsupervised policy implementing unit for implementing the unsupervised driving mode-related driving policy to govern the supervised driving mode. Moreover, the driving mode transitioning system comprises an unsupervised mode enabling unit for enabling the unsupervised autonomous driving mode to be activated for the ADS, when positioning and/or velocity of the vehicle has reached compliance with unsupervised dynamic driving conditions of the unsupervised driving mode-related driving policy.

Furthermore, the disclosed subject-matter relates to a vehicle comprising a driving mode transitioning system as described herein.

Moreover, the disclosed subject-matter relates to a computer program product comprising a computer program containing computer program code means arranged to cause a computer or a processor to execute the steps of a driving mode transitioning system described herein, stored on a computer-readable medium or a carrier wave.

The disclosed subject-matter further relates to a non-volatile computer readable storage medium having stored thereon said computer program product.

Thereby, there is introduced an approach enabling and/or leading up to a transitioning to an unsupervised autonomous driving mode of a vehicle ADS being reliable and/or robust. That is, since there is obtained vehicle situational data indicating a state of vehicle surroundings along with position and heading of the vehicle, there is obtained as the vehicle is travelling, continuously and/or intermittently—e.g. with support from one or more onboard surrounding detecting sensors and/or an onboard position determining system e.g. with further support from a digital map—information revealing the moving vehicle's environmental circumstances as well as its whereabouts. Furthermore, that is, since there is determined based on the obtained vehicle situational data, that unsupervised driving conditions of an unsupervised driving mode-related driving policy pertinent an unsupervised autonomous driving mode of the ADS, are complied with, it may be established by assessing the state of vehicle surroundings along with the position and heading of the vehicle in view of operating conditions—such as at least static driving conditions e.g. comprising static environmental and/or geographical conditions—stipulated by a driving policy defined for an unsupervised automation, when such operating conditions are fulfilled for the vehicle. Accordingly, by analyzing the obtained vehicle situational data and compare the therein indicated state of vehicle surroundings along with the position and heading of the vehicle to—e.g. static—requirements associated with the unsupervised autonomous driving mode—such as e.g. static operating conditions of an ODD under which said unsupervised autonomous driving mode is designed and/or verified to function—occurrence of compliance with said requirements may be determined. Moreover, that is, since there is determined that the ADS has active a supervised driving mode, it may be established when there for the vehicle is active—and/or has been activated—a supervised automation, for instance an ADAS feature and/or function. Furthermore, that is, since there is implemented the unsupervised driving mode-related driving policy to govern the supervised driving mode, said unsupervised driving mode-related driving policy is used for the supervised driving mode following there having been established both that the unsupervised driving conditions of the unsupervised driving mode-related driving policy are complied with for the vehicle and that the ADS is in a supervised driving mode. Accordingly, the unsupervised automation strategy defined for the unsupervised autonomous driving mode—such as concerning perception and/or planning—are put into effect with the ADS remaining in the supervised driving mode.

Moreover, that is, since there is enabled the unsupervised autonomous driving mode to be activated for the ADS, when positioning and/or velocity of the vehicle has reached compliance with unsupervised dynamic driving conditions of the unsupervised driving mode-related driving policy, the ADS's unsupervised driving mode is allowed to be activated once positioning and/or velocity of the vehicle has been tuned in and/or adapted to an extent fulfilling criteria of the unsupervised automation strategy relating to positioning and/or velocity of the vehicle. That is, the ADS is enabled to implement the unsupervised autonomous driving mode following positioning and/or velocity of the vehicle having been adjusted to comply with requirements relating thereto stipulated by the unsupervised driving mode-related driving policy, thus subsequently implying that transitioning to the unsupervised autonomous driving mode not is allowed until said requirements are fulfilled. Since the same—or essentially the same—driving policy is used for the supervised driving mode as is intended for the unsupervised autonomous driving mode, there may be ensured that dynamic driving conditions defined for the unsupervised autonomous driving mode—such as in view of distance keeping and/or lateral lane positioning—are complied with prior to activation of the unsupervised autonomous driving mode is allowed. Consequently, with the introduced concept, there is no need to rely on a vehicle driver to drive the vehicle properly—that is in accordance with stipulated dynamic driving-related criteria—in order to allow said unsupervised autonomous driving mode to be activated. Accordingly, with the introduced concept, the risk of said dynamic driving-related criteria ceasing to be fulfilled—and consequently the unsupervised autonomous driving mode becoming unavailable—due to said vehicle driver not driving and/or no longer driving in a manner fulfilling said stipulated dynamic driving-related criteria—for instance by increasing speed too much and/or driving too close to a vehicle ahead—is eliminated and/or reduced.

For that reason, an approach is provided for in an improved and/or alternative manner support transitioning to an unsupervised autonomous driving mode of a vehicle ADS.

The technical features and corresponding advantages of the above mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
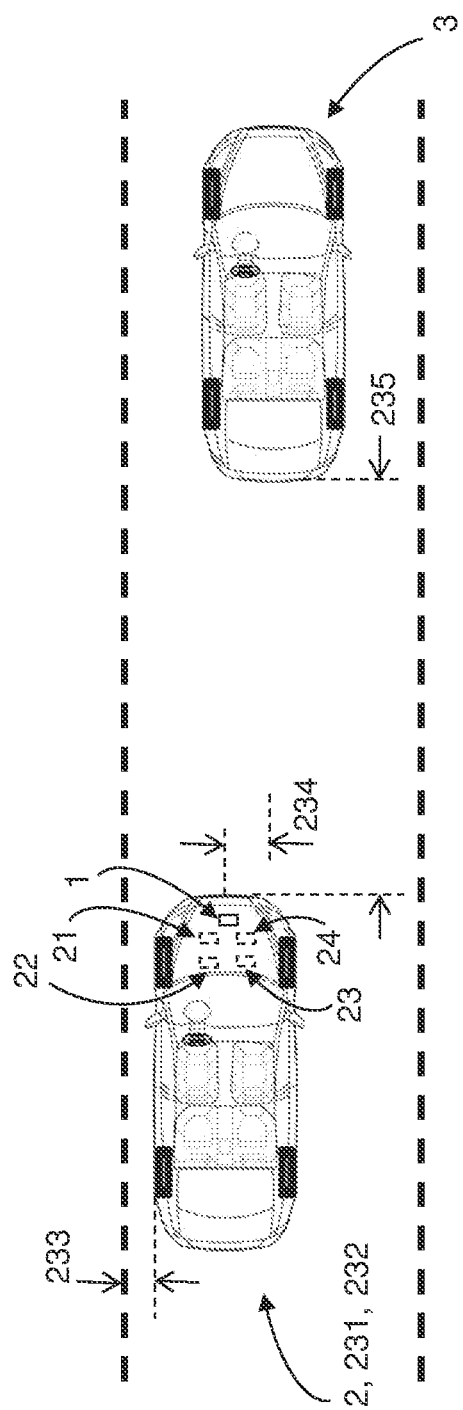
FIG. 1 illustrates a schematic view of an exemplifying driving mode transitioning system according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to supporting transitioning to an unsupervised autonomous driving mode of ADS of a vehicle, there will be disclosed an approach enabling and/or leading up to such a transitioning being reliable and/or robust.

Figure 2:
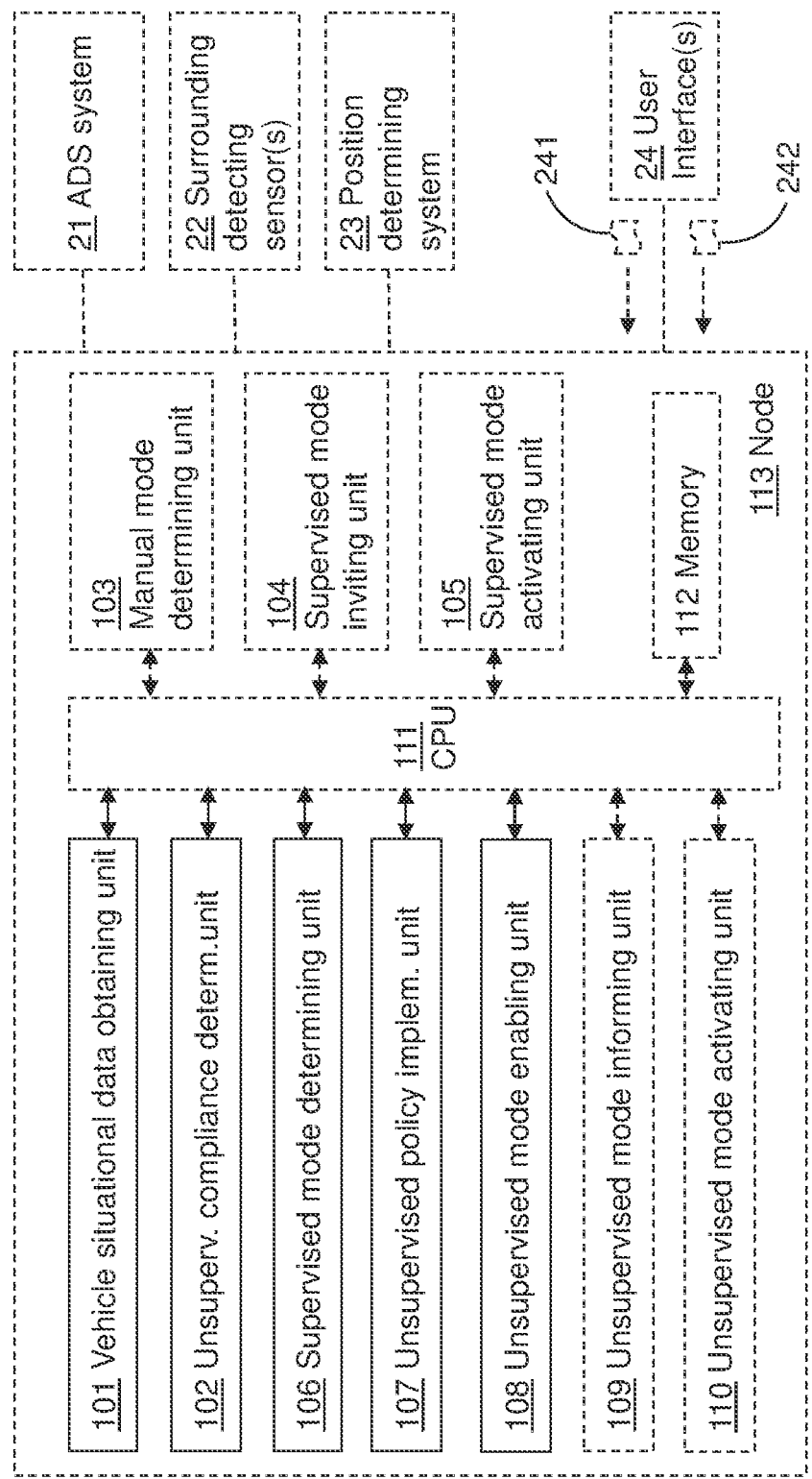
FIG. 2 is a schematic block diagram illustrating an exemplifying driving mode transitioning system according to embodiments of the disclosure.

Referring now to the figures, there is depicted in FIG. 1 a schematic view—and in FIG. 2 a schematic block diagram—respectively illustrating an exemplifying driving mode transitioning system 1 according to embodiments of the disclosure. The driving mode transitioning system 1 is adapted for supporting transitioning to an unsupervised autonomous driving mode of an ADS 21 of a vehicle 2. The vehicle 2—which may be referred to as ego-vehicle or host vehicle—may be represented by any arbitrary—e.g. known—manned or unmanned vehicle, for instance an engine-propelled or electrically-powered vehicle such as a car, truck, lorry, van, bus and/or tractor. Moreover, the term "vehicle" may refer to "autonomous and/or at least partly autonomous vehicle", "driverless and/or at least partly driverless vehicle", and/or "self-driving and/or at least partly self-driving vehicle". Moreover, the ADS 21 of and/or for the vehicle 2 may be represented by any arbitrary ADAS or AD system e.g. known in the art and/or yet to be developed. The ADS 21 and/or vehicle 2 may comprise a perception system (not shown)—which may also be referred to as environmental perception system, sensor fusion module and/or perception module—that may be represented by any—e.g., known—system and/or functionality, e.g. comprised in one or more electronic control modules, ECUs, and/or nodes of the vehicle 2 and/or the ADS 21, adapted and/or configured to interpret sensory information—relevant for driving of the vehicle 2—to identify e.g. objects, obstacles, vehicle lanes, relevant signage, appropriate navigation paths etc., for instance with support from a—e.g. commonly known—digital map (not shown) such as a high definition, HD, map, and/or an equivalent and/or successor thereof. Such an optional perception system—which may be adapted to support e.g. sensor fusion, tracking, localization etc.—may thus be adapted to rely on sensory information. Such exemplifying sensory information may for instance be derived from one or more—e.g. commonly known—sensors comprised in and/or provided onboard the vehicle 2—herein also referred to as vehicle-mounted and/or onboard sensors—adapted to sense and/or perceive the vehicle's 2 surroundings and/or whereabouts, for instance represented by one or a combination of one or more of surrounding detecting sensors 22, such as image capturing devices e.g. cameras, LIDARs, RADARs, ultrasonic sensors etc., and/or a positioning system, odometer, inertial measurement units etc. In other words, a perception system is in the present context thus to be understood as a module and/or system responsible for acquiring raw sensor data from on-board sensors and converting this raw data into scene understanding. The vehicle 2 and/or ADS 21 may further comprise an optional position determining system 23, which may be represented by any arbitrary feasible—e.g. known—sensors and/or functionality e.g. positioning system adapted to sense, derive and/or determine whereabouts and/or geographical position of the vehicle 2, for instance via GNSS such as GPS.

Unsupervised autonomous driving mode may throughout the disclosure relate to autonomous driving of the ADS-equipped vehicle 2 without a vehicle occupant—such as a vehicle driver—being required to supervise said driving. The unsupervised autonomous driving mode may thus for instance correspond to one of the commonly known levels 3, 4 or 5 of driving automation as defined by the SAE J3016. Furthermore, the phrase "driving mode transitioning system" may refer to "ADS transitioning system", "transitioning supporting system", "unsupervised mode enabling system" and/or "assessment system", whereas "a method for supporting transitioning" may refer to "an at least partly computer-implemented method for supporting transitioning". "For supporting transitioning to an unsupervised autonomous driving mode", on the other hand, may refer to "for supporting transitioning to an unsupervised automation", "for supporting adaptation, move and/or transfer to an unsupervised autonomous driving mode", "for supporting transitioning to a driver-unsupervised and/or vehicle occupant-unsupervised autonomous driving mode" and/or "for supporting transitioning from a supervised driving mode and/or manual driving mode to an unsupervised autonomous driving mode". Moreover, "for supporting transitioning to an unsupervised autonomous driving mode of an ADS of a vehicle" may further according to an example refer to "for supporting transitioning to an unsupervised autonomous driving mode for an ADS software comprised in an ADS of a vehicle". Furthermore, "ADS of a vehicle" may refer to "ADS for a vehicle", and according to an example in this context further to "ADS-equipped vehicle".

As illustrated in an exemplifying manner in exemplifying FIGS. 1 and 2, the driving mode transitioning system 1 is—e.g. by means of a vehicle situational data obtaining unit 101—adapted and/or configured for obtaining vehicle situational data indicating a state of vehicle surroundings along with position 231 and heading 232 of the vehicle 2. Thereby, as the vehicle 2 is travelling, there is obtained continuously and/or intermittently—e.g. with support from one or more onboard surrounding detecting sensors 22 and/or an onboard position determining system 23 e.g. with further support from a digital map—information revealing the moving vehicle's 2 environmental circumstances as well as its whereabouts 231, 232.

The vehicle situational data indicating a state of vehicle surroundings along with position 231 and heading 232 of the vehicle 2, may be gathered and/or derived in any feasible—e.g. known—manner. For instance, the state of the vehicle surroundings may be determined—and/or have been determined—in any arbitrary—e.g. known—manner, for instance by means of and/or with input derived from one or more of the optional surrounding detecting sensors 22 and/or optional perception system discussed above. In exemplifying FIG. 1, the vehicle situational data indicates in an exemplifying manner a state of vehicle surroundings comprising a surrounding vehicle 3 being positioned and/or driving ahead of—here in a same lane as—the vehicle 2. Similarly, the position 231 and heading 232 of the vehicle 2 may be determined—and/or have been determined—in any arbitrary—e.g. known—manner, for instance by means of and/or with input derived from the previously discussed optional position determining system 23 e.g. with support from an electronic map such as the optional digital map discussed above, further potentially with additional support from dead reckoning computations and/or similar approaches.

The phrase "obtaining vehicle situation data" may refer to "gathering and/or deriving vehicle situational data" and/or "obtaining continuously and/or intermittently vehicle situational data", whereas "vehicle situational data" may refer to "driving state data", "vehicle scene data", "status data", merely "data" and/or "vehicle situational information". According to an example, "obtaining vehicle situational data indicating a state of vehicle surroundings along with position and heading of said vehicle" may refer to "obtaining surrounding state data indicating a state of vehicle surroundings and vehicle position/heading data indicating a position and heading of said vehicle". Moreover, "vehicle situational data indicating a state of vehicle surroundings along with position and heading of said vehicle" may further refer to "vehicle situational data indicating a current—or essentially current—state of vehicle surroundings along with current—or essentially current—position and heading of said vehicle". The phrase "vehicle situational data indicating", on the other hand, may refer to "vehicle situational data comprising information of, indicating and/or revealing", whereas "vehicle surroundings" may refer to "surroundings of said vehicle" and/or "environmental circumstances in said vehicle's surroundings". Moreover, "position and heading of said vehicle" may refer to "geographical position and heading of said vehicle" and/or "position and driving direction of said vehicle", whereas "a state of vehicle surroundings" may refer to "status and/or circumstances of vehicle surroundings".

As illustrated in an exemplifying manner in exemplifying FIGS. 1 and 2, the driving mode transitioning system 1 is further—e.g. by means of an unsupervised compliance determining unit 102—adapted and/or configured for determining based on the obtained vehicle situational data, that unsupervised driving conditions of an unsupervised driving mode-related driving policy pertinent an unsupervised autonomous driving mode of the ADS 21, are complied with. Thereby, by assessing the state of vehicle surroundings along with the position 231 and heading 232 of the vehicle 2 in view of operating conditions— such as at least static driving conditions e.g. comprising static environmental and/or geographical conditions—stipulated by a driving policy defined for an unsupervised automation, it may be established when such operating conditions are fulfilled for the vehicle 2. Accordingly, by analyzing the obtained vehicle situational data and compare the therein indicated state of vehicle surroundings along with the position 231 and heading 232 of the vehicle 2 to—e.g. static—requirements associated with the unsupervised autonomous driving mode— such as e.g. static operating conditions of an ODD under which said unsupervised autonomous driving mode is designed and/or verified to function—occurrence of compliance with said requirements may be determined.

The unsupervised driving mode-related policy may be— and/or have been—designed, defined, determined and/or selected in any arbitrary feasible—e.g. known—manner, for instance as feasible and/or deemed suitable for the unsupervised autonomous driving mode—and/or implementation— at hand. The unsupervised driving-mode related policy may accordingly be represented by any arbitrary feasible—e.g. known—driving-related strategy, tactics and/or approach(es) in view of unsupervised automation, such as concerning perception and/or planning, and for instance comprise strategies relating to one or more of—as exemplified in FIG. 1—distance to lane edge(s) 233, offset from lane center 234, following distance 235 to potential vehicle 3 ahead, etc. The unsupervised driving conditions of the predeterminable unsupervised driving mode-related policy, on the other hand, may refer to any arbitrary feasible—e.g. known—operational conditions—such as static operational conditions—defined for the unsupervised autonomous driving mode of the ADS 21. The predeterminable unsupervised driving conditions may accordingly for instance be represented by one or more of environmental condition(s), geographical condition(s), temporal condition(s), roadway characteristics condition(s), traffic characteristics conditions(s) etc. According to an example, the unsupervised driving conditions may comprise the indicated position 231 and heading 232 of the vehicle 2 complying with a geographical area in which and/or road along which—the unsupervised autonomous driving mode is designed and/or verified to function along with the indicated state of vehicle surroundings of said vehicle 2 demonstrating compliance with environmental—e.g. static—circumstances under which the unsupervised autonomous driving mode is designed and/or verified to function.

The phrase "determining based on the obtained vehicle situational data" may refer to "identifying based on the obtained vehicle situational data", "determining by assessing and/or analyzing the obtained vehicle situational data" and/or "determining from assessment and/or analysis of the obtained vehicle situational data". According to an example, "determining based on the obtained vehicle situational data, that unsupervised driving conditions of an unsupervised driving mode-related policy pertinent an unsupervised autonomous driving mode of said ADS, are complied with" may refer to "determining from assessment of the obtained vehicle situational data in view of unsupervised driving conditions of an unsupervised driving-mode-related driving policy pertinent an unsupervised autonomous driving mode of said ADS, that said unsupervised driving conditions are complied with". The phrase "unsupervised driving conditions", on the other hand, may refer to "predeterminable unsupervised driving conditions", "ODD conditions and/or attributes", "unsupervised driving requirements", "operating conditions" and/or merely "conditions", whereas "conditions" in this context according to an example may refer to "static conditions, for instance comprising geographical conditions". Moreover, "unsupervised driving mode-related driving policy" may refer to "predeterminable unsupervised driving mode-related driving policy", "unsupervised driving policy", "unsupervised driving mode-related policy" and/or "unsupervised driving mode-related driving strategy, approach and/or tactics", and according to an example further to "unsupervised driving mode-related driving policy e.g. comprised in and/or involving an at least first piece of software and/or ADS-related software". The phrase "unsupervised driving mode-related driving policy pertinent an unsupervised autonomous driving mode", on the other hand, may refer to "unsupervised driving mode-related driving policy defined for, valid for, associated with and/or applicable for an unsupervised autonomous driving mode", whereas "unsupervised autonomous driving mode of said ADS" may refer to "driver-unsupervised and/or vehicle occupant-unsupervised autonomous driving mode of said ADS" and/or "unsupervised automation of said ADS". Moreover, "unsupervised driving conditions [ . . . ] are complied with" may refer to "unsupervised driving conditions [ . . . ] are fulfilled".

The vehicle 2 may be—and/or have been—in any arbitrary feasible driving mode prior to and/or during the determination of that the unsupervised driving conditions are complied with. Thus, optionally, and as illustrated in an exemplifying manner in exemplifying FIGS. 1 and 2, the driving mode transitioning system 1 may—e.g. by means of an optional manual mode determining unit 103—be adapted and/or configured for determining that the vehicle 2 is in a manual driving mode. Thereby, it may be established and/or identified that the vehicle 2 is fully—or essentially fully— controlled and/or driven by a vehicle driver.

The driving mode transitioning system 1 may then further—e.g. by means of an optional supervised mode inviting unit 104—be adapted and/or configured for providing, via a user interface 24 associated with the vehicle 2, information inviting a vehicle occupant to activate a supervised driving mode of the ADS 21. Thereby, there may be presented and/or notified within the vehicle 2 with support from a vehicle user interface 24—for instance comprising onboard touch display(s), loudspeaker(s) and/or microphones(s)— the availability of—and/or instructions to activate, select, transition to and/or accept—at least a first supervised driving mode of the ADS 21, such as for instance adaptive cruise control and/or lane keeping assistance. Optionally, and as illustrated in an exemplifying manner in exemplifying FIG. 2, the driving mode transitioning system 1 may then further—e.g. by means of an optional supervised mode activating unit 105—be adapted and/or configured for activating a supervised driving mode of the ADS 21, when receiving—e.g. from said user interface 24—selection data 241 indicating selection thereof. Thereby, transitioning to a supervised driving mode of the ADS 21 may take place, for instance following receiving confirmation of said supervised driving mode being selected and/or activated—e.g. by a vehicle occupant such as a vehicle driver—via said optional user interface 24.

As illustrated in an exemplifying manner in exemplifying FIGS. 1 and 2, the driving mode transitioning system 1 is further—e.g. by means of a supervised mode determining unit 106—adapted and/or configured for determining that the ADS 21 has active a supervised driving mode. Thereby, it may be established when there for the vehicle 2 is active—and/or has been activated—a supervised automation, for instance an ADAS feature and/or function supported by the ADS 21 such as for instance adaptive cruise control and/or lane keeping assistance.

Supervised driving mode may throughout the disclosure relate to automation and/or driving of the ADS-equipped vehicle 2 with assistance from the ADS 21, with a vehicle occupant—such as a vehicle driver—being required to supervise said driving. According to an example, the supervised driving mode may for instance correspond to one of the commonly known levels 1-2 of driving automation as defined by the SAE J3016. Moreover, the phrase "determining that said ADS has active a supervised driving mode" may refer to "identifying and/or deriving that said ADS has active a supervised driving mode", "determining that said ADS has active—and/or that there has been activated for said ADS—a supervised driving mode", whereas "supervised driving mode" may refer to "driver-supervised and/or vehicle occupant-supervised driving mode" and/or "supervised automation". According to an example, "supervised driving mode" may further refer to "ADAS driving mode".

Optionally, determining that the ADS 21 has active a supervised driving mode may comprise—and/or said supervised mode determining unit 106 may be adapted and/or configured for—determining that said ADS 21 has active a supervised driving mode governed by a supervised driving mode-related driving policy. Thereby, the supervised automation is controlled by a driving-related strategy defined therefore. The supervised driving mode-related policy may be—and/or have been—designed, defined, determined and/or selected in any arbitrary feasible—e.g. known—manner, for instance as feasible and/or deemed suitable for the supervised driving mode—and/or implementation—at hand. The supervised driving-mode related policy may accordingly be represented by any arbitrary feasible—e.g. known—driving-related strategy, tactics and/or approach(es) in view of supervised automation, such as concerning perception and/or planning, and for instance comprise strategies relating to one or more of—as exemplified in FIG. 1—distance to lane edge(s) 233, offset from lane center 234, following distance 235 to potential vehicle 3 ahead, etc. The phrase "supervised driving mode-related driving policy" may refer to "predeterminable supervised driving mode-related driving policy", "supervised driving policy" and/or "supervised driving mode-related driving strategy, approach and/or tactics", and according to an example further to "supervised driving mode-related driving policy e.g. comprised in and/or involving an at least second piece of software and/or ADS-related software, at least partly differing from said at least first piece of software and/or said at least first ADS-related software". The phrase "supervised driving mode-related driving policy", on the other hand, may refer to "supervised driving mode-related driving policy pertinent, defined for, valid for, associated with and/or applicable for said supervised driving mode".

As illustrated in an exemplifying manner in exemplifying FIG. 2, the driving mode transitioning system 1 is further—e.g. by means of an unsupervised policy implementing unit 107—adapted and/or configured for implementing the unsupervised driving mode-related driving policy to govern the supervised driving mode. Thereby, following there having been established both that the unsupervised driving conditions of the unsupervised driving mode-related driving policy are complied with for the vehicle 2 and that the ADS 21 is in a supervised driving mode, said unsupervised driving mode-related driving policy is used for the supervised driving mode. Accordingly, the unsupervised automation strategy defined for the unsupervised autonomous driving mode—such as concerning perception and/or planning—are put into effect with the ADS 21 remaining in the supervised driving mode.

The unsupervised driving mode-related policy may be implemented to govern the supervised driving mode at any arbitrary feasible time instant subsequent there being determined both that the unsupervised driving conditions pertinent the unsupervised autonomous driving mode are complied with and that a supervised driving mode of the ADS 21 is active, such as immediately thereafter and/or a predeterminable period thereafter. Furthermore, implementing the unsupervised driving mode-related driving policy may imply involvement of any feasible predeterminable set and/or portion of hardware e.g. onboard surrounding detecting sensors 22 and/or ADS software. Moreover, the phrase "implementing said unsupervised driving-mode related driving policy" may refer to "put into effect, using and/or switching to said unsupervised driving-mode related driving policy", whereas "to govern said supervised driving mode" may refer to "with said supervised driving mode remaining active" and/or "to control said supervised driving mode".

As discussed in the foregoing, the supervised driving mode may optionally previously and/or initially have been governed by a supervised driving mode-related driving policy. Thus, further optionally, should that be the case, implementing the unsupervised driving mode-related driving policy may then comprise—and/or said unsupervised policy implementing unit 107 may then be adapted and/or configured for—switching from the supervised driving mode-related driving policy to the unsupervised driving mode-related driving policy, with said supervised driving mode remaining active. Thereby, following there having been established both that the unsupervised driving conditions of the unsupervised driving mode-related driving policy are complied with for the vehicle 2 and that the ADS 21 is in a supervised driving mode, the supervised driving mode-related driving policy is replaced with the unsupervised driving mode-related driving policy, for the supervised driving mode. Accordingly, the unsupervised automation strategy defined for the unsupervised autonomous driving mode—such as concerning perception and/or planning—are put into effect instead of the supervised driving mode-related driving policy, with the ADS 21 remaining in the supervised driving mode. The optional supervised driving mode-related driving policy may imply involvement of any feasible predeterminable set and/or portion of hardware e.g. onboard surrounding detecting sensors 22 and/or ADS software, which at least partly may differ from the set and/or portion of hardware e.g. onboard surrounding detecting sensors 22 and/or ADS software involved for the unsupervised driving-mode related driving policy.

As illustrated in an exemplifying manner in exemplifying FIGS. 1 and 2, the driving mode transitioning system 1 is further—e.g. by means of an unsupervised mode enabling unit 108—adapted and/or configured for enabling the unsupervised autonomous driving mode to be activated for the ADS 21, when positioning and/or velocity of the vehicle 2 has reached compliance with unsupervised dynamic driving conditions of the unsupervised driving mode-related driving policy. Thereby, the ADS's 21 unsupervised driving mode is allowed to be activated once positioning and/or velocity of the vehicle 2 has been tuned in and/or adapted to an extent fulfilling criteria of the unsupervised automation strategy relating to positioning and/or velocity of the vehicle 2. That is, the ADS 21 is enabled to implement the unsupervised autonomous driving mode following positioning and/or velocity of the vehicle 2 having been adjusted to comply with requirements relating thereto stipulated by the unsupervised driving mode-related driving policy, thus subsequently implying that transitioning to the unsupervised autonomous driving mode not is allowed until said requirements are fulfilled. Since the same—or essentially the same—driving policy is used for the supervised driving mode as is intended for the unsupervised autonomous driving mode, there may be ensured that dynamic driving conditions defined for the unsupervised autonomous driving mode—such as in view of distance keeping and/or lateral lane positioning—are complied with prior to activation of the unsupervised autonomous driving mode is allowed. Consequently, with the introduced concept, there is no need to rely on a vehicle driver to drive the vehicle 2 properly—that is in accordance with stipulated dynamic driving-related criteria—in order to allow said unsupervised autonomous driving mode to be activated. Accordingly, with the introduced concept, the risk of said dynamic driving-related criteria ceasing to be fulfilled—and consequently the unsupervised autonomous driving mode becoming unavailable—due to said vehicle driver not driving and/or no longer driving in a manner fulfilling said stipulated dynamic driving-related criteria—for instance by increasing speed too much and/or driving too close to a vehicle ahead—is eliminated and/or reduced.

The unsupervised autonomous driving mode may be enabled in any arbitrary feasible manner, such as being made available for selection and/or activation, for instance to—and/or by—a vehicle occupant such as a vehicle driver. Moreover, a time period for reaching compliance with unsupervised dynamic driving conditions of the unsupervised driving mode-related driving policy, may be of any arbitrary feasible time duration needed and/or required for the ADS 21 to adjust from the vehicle's 2 current positioning and/or velocity to the unsupervised dynamic driving conditions stipulated by the unsupervised driving mode-related driving policy, thus for instance range up to several seconds or even occasionally tens of seconds depending on the circumstances. Furthermore, the unsupervised dynamic driving conditions of the unsupervised driving mode-related driving policy may be represented by any arbitrary feasible—e.g. known—dynamic driving-related criteria, and for instance at least comprise and/or relate to positioning and/or velocity conditions, and/or for instance at least comprise and/or relate to distance keeping and/or lateral lane positioning.

The phrase "enabling said unsupervised autonomous driving mode to be activated for said ADS" may refer to "allowing said unsupervised autonomous driving mode to be activated for said ADS" and/or "making available for selection and/or activation said unsupervised autonomous driving mode of the ADS", and according to an example further to "enabling said unsupervised autonomous driving mode to be activated for said ADS governed by said unsupervised driving mode-related driving policy". Moreover, "when positioning and/or velocity of said vehicle has reached compliance with" may refer to "upon, once and/or provided that positioning and/or velocity of said vehicle has reached compliance with" and/or "when positioning and/or velocity of said vehicle complies with", and according to an example further to "when dynamic driving circumstances—such as positioning and/or velocity—of said vehicle has reached compliance with". The phrase "unsupervised dynamic driving conditions", on the other hand, may refer to "predeterminable unsupervised dynamic driving conditions" and/or "unsupervised dynamic driving requirements and/or criteria", and according to an example further to "unsupervised dynamic driving conditions—such as relating to at least positioning and/or velocity—" and/or "unsupervised dynamic driving conditions—such as relating to at least distance keeping and/or lateral lane positioning—". Moreover, "unsupervised dynamic driving conditions of said unsupervised driving mode-related driving policy" may refer to "unsupervised dynamic driving conditions stipulated and/or defined by said unsupervised driving mode-related driving policy". Furthermore, vehicle control authority may differ between the supervised driving mode and the unsupervised autonomous driving mode; vehicle control authority necessary for the unsupervised driving mode-related driving policy, however, may be available also to the supervised driving mode.

Optionally, and as illustrated in an exemplifying manner in exemplifying FIGS. 1 and 2, the driving mode transitioning system 1 may further—e.g. by means of an optional unsupervised mode informing unit 109—be adapted and/or configured for providing via a user interface 24 associated with the vehicle 2, information indicating to a vehicle occupant that the unsupervised autonomous driving mode is available for activation. Thereby, there may be presented and/or notified within the vehicle 2 with support from a vehicle user interface 24—for instance comprising onboard touch display(s), loudspeaker(s) and/or microphones(s)—the availability of—and/or instructions to activate, select, transition to and/or accept—the unsupervised autonomous driving mode of the ADS 21. The user interface 24 may—or may not—be represented at least in part by the optional user interface 24 discussed above in conjunction with inviting a vehicle occupant to activate a supervised driving mode of the ADS 21.

Further optionally, and as illustrated in an exemplifying manner in exemplifying FIG. 2, the driving mode transitioning system 1 may further—e.g. by means of an optional unsupervised mode activating unit 110—be adapted and/or configured for activating the unsupervised autonomous driving mode, when receiving—e.g. from the user interface 24—selection data 242 indicating selection of the unsupervised autonomous driving mode. Thereby, transitioning to the unsupervised autonomous driving mode of the ADS 21 may take place, for instance following receiving confirmation of said unsupervised autonomous driving mode being selected and/or activated—e.g. by a vehicle occupant such as a vehicle driver—via said optional user interface 24. Accordingly, since there may be ensured, as described in the foregoing, that dynamic driving conditions defined for the unsupervised autonomous driving mode—such as in view of distance keeping and/or lateral lane positioning—are complied with prior to activation of the unsupervised autonomous driving mode, a seamless transition from the supervised driving mode to the unsupervised autonomous driving mode, may be achieved.

As further shown in FIG. 2, the driving mode transitioning system 1 comprises a vehicle situational data obtaining unit 101, an unsupervised compliance determining unit 102, an optional manual mode determining unit 103, an optional supervised mode inviting unit 104, an optional supervised mode activating unit 105, a supervised mode determining unit 106, an unsupervised policy implementing unit 107, an unsupervised mode enabling unit 108, an optional unsupervised mode informing unit 109, and an optional unsupervised mode activating unit 110, all of which already have been described in greater detail above. Furthermore, the embodiments herein for supporting transitioning to an unsupervised autonomous driving mode of an ADS 21 of a vehicle 2, may be implemented through one or more processors, such as a processor 111, for instance represented by at least a first Central Processing Unit, CPU, and/or at least a first Graphics Processing Unit, GPU, together with computer program code for performing the functions and actions of the embodiments herein. Said program code may also be provided as a computer program product, for instance in the form of a data carrier carrying computer program code for performing the embodiments herein when being loaded into the driving mode transitioning system 1. One such carrier may be in the form of a CD/DVD ROM disc and/or a hard drive, it is however feasible with other data carriers. The computer program code may furthermore be provided as pure program code on a server and downloaded to the driving mode transitioning system 1. The driving mode transitioning system 1 may further comprise a memory 112 comprising one or more memory units. The memory 112 optionally includes high-speed random access memory, such as DRAM, SRAM, DDR RAM, or other random access solid-state memory devices, and further optionally includes non-volatile memory, such as one or more magnetic disk storage devices, optical disk storage devices, flash memory devices, or other non-volatile solid-state storage devices. Moreover, the memory 112 may be arranged to be used to store e.g. information, and further to store data, configurations, scheduling, and applications, to perform the methods herein when being executed in the driving mode transitioning system 1. For instance, the computer program code may be implemented in the firmware, stored in FLASH memory 112, of an embedded processor 111, and/or downloaded wirelessly e.g. from an off-board server. Furthermore, units 101-110, the optional processor 111 and/or the optional memory 112, may at least partly be comprised in one or more nodes 113 e.g. ECUs of the vehicle 2, e.g. in and/or in association with the ADS 21. Those skilled in the art will also appreciate that said units 101-110 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 112, that when executed by the one or more processors such as the processor 111 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 3:
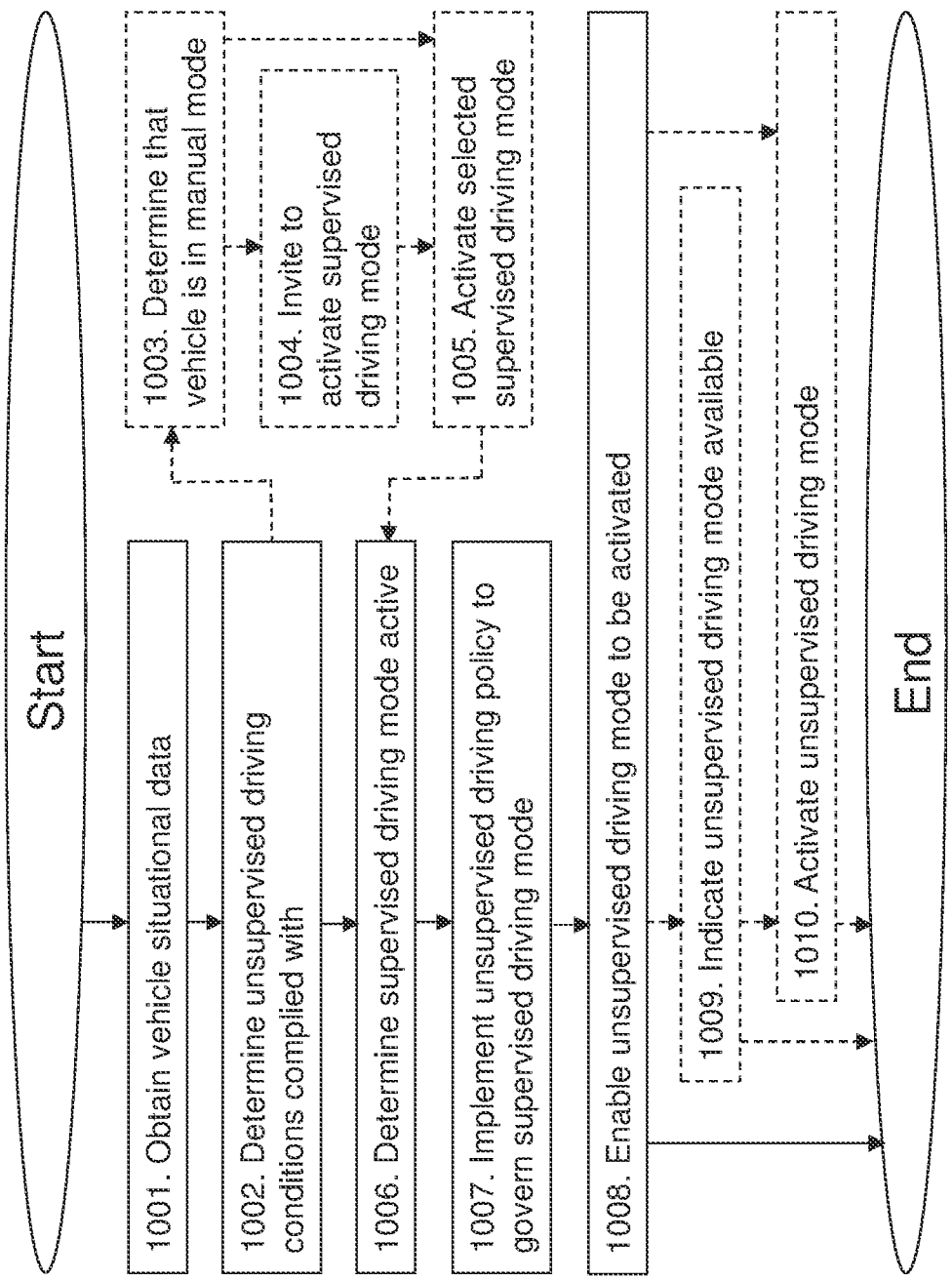
FIG. 3 is a flowchart depicting an exemplifying method performed by a driving mode transitioning system according to embodiments of the disclosure.

FIG. 3 is a flowchart depicting an exemplifying method performed by a driving mode transitioning system 1 according to embodiments of the disclosure. Said method is for supporting transitioning to an unsupervised autonomous driving mode of an ADS 21 of a vehicle 2. The exemplifying method, which may be continuously repeated, comprises one or more of the following actions discussed with support from FIGS. 1-2. Moreover, the actions may be taken in any suitable order and/or one or more actions may be performed simultaneously and/or in alternate order where applicable. For instance, Actions 1001-1002 and optional Actions 1003-1005 may be performed simultaneously and/or in alternate order.

Action 1001

In Action 1001, the driving mode transitioning system 1 obtains—e.g. with support from the vehicle situational data obtaining unit 101—vehicle situational data indicating a state of vehicle surroundings along with position 231 and heading 232 of the vehicle 2.

Action 1002

In Action 1002, the driving mode transitioning system 1 determines—e.g. with support from the unsupervised compliance determining unit 102—based on the obtained vehicle situational data, that unsupervised driving conditions of an unsupervised driving mode-related driving policy pertinent an unsupervised autonomous driving mode of the ADS 21, are complied with.

Action 1003

In optional Action 1003, the driving mode transitioning system 1 may determine—e.g. with support from the optional manual mode determining unit 103—that the vehicle 2 is in a manual driving mode.

Action 1004

In optional Action 1004, which may follow upon optional Action 1003, the driving mode transitioning system 1 may provide—e.g. with support from the optional supervised mode inviting unit 104—via a user interface 24 associated with the vehicle 2, information inviting a vehicle occupant to activate a supervised driving mode of the ADS 21.

Action 1005

In optional Action 1005, which may follow upon optional Action 1003 or optional Action 1004, the driving mode transitioning system 1 may activate—e.g. with support from the optional supervised mode activating unit 105—a supervised driving mode of the ADS, when receiving—e.g. from the user interface 24—selection data indicating selection thereof.

Action 1006

In Action 1006, the driving mode transitioning system 1 determines—e.g. with support from the supervised mode determining unit 106—that the ADS 21 has active a supervised driving mode.

Optionally, Action 1006 of determining that the ADS 21 active a supervised driving mode may comprise—and/or said supervised mode determining unit 106 may be adapted and/or configured for—determining that the ADS 21 has active a supervised driving mode governed by a supervised driving mode-related driving policy.

Action 1007

In Action 1007, the driving mode transitioning system 1 implements—e.g. with support from the unsupervised policy implementing unit 107—the unsupervised driving mode-related driving policy to govern the supervised driving mode.

Optionally, should the supervised driving mode be governed by a supervised driving mode-related driving policy, then Action 1007 of implementing the unsupervised driving mode-related driving policy may comprise—and/or said unsupervised policy implementing unit 107 may be adapted and/or configured for—switching from the supervised driving mode-related driving policy to the unsupervised driving mode-related driving policy, with the supervised driving mode remaining active.

Action 1008

In Action 1008, the driving mode transitioning system 1 enables—e.g. with support from the unsupervised mode enabling unit 108—the unsupervised autonomous driving mode to be activated for the ADS 21, when positioning and/or velocity of the vehicle 2 has reached compliance with unsupervised dynamic driving conditions of the unsupervised driving mode-related driving policy.

Action 1009

In optional Action 1009, the driving mode transitioning system 1 may provide—e.g. with support from the optional unsupervised mode informing unit 109—via a user interface 24 associated with the vehicle 2, information indicating to a vehicle occupant that the unsupervised autonomous driving mode is available for activation.

Action 1010

In optional Action 1010, which may follow upon optional Action 1008 or optional Action 1009, the driving mode transitioning system 1 may activate—e.g. with support from the optional unsupervised mode activating unit 1010— the unsupervised autonomous driving mode, when receiving— e.g. from the user interface 24—selection data 242 indicating selection of the unsupervised autonomous driving mode.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a driving mode transitioning system for supporting transitioning to an unsupervised autonomous driving mode of an Automated Driving System, ADS, of a vehicle, the method comprising:
    obtaining vehicle situational data indicating a state of vehicle surroundings along with position and heading of the vehicle;
    determining based on the obtained vehicle situational data, that unsupervised driving conditions of an unsupervised driving mode-related driving policy pertinent an unsupervised autonomous driving mode of the ADS, are complied with;
    determining that the ADS has active a supervised driving mode governed by a supervised driving mode-related driving policy;
    implementing the unsupervised driving mode-related driving policy to govern the supervised driving mode, the implementing comprising switching from the supervised driving mode-related driving policy to the unsupervised driving mode-related driving policy, with the supervised driving mode remaining active; and
    enabling the unsupervised autonomous driving mode to be activated for the ADS, when one or both of positioning and velocity of the vehicle has reached compliance with unsupervised dynamic driving conditions of the unsupervised driving mode-related driving policy.

2. The method according to claim 1, further comprising:
    providing via a user interface associated with the vehicle, information indicating to a vehicle occupant that the unsupervised autonomous driving mode is available for activation.

3. The method according to claim 1, further comprising: activating the unsupervised autonomous driving mode, when receiving selection.

4. The method according to claim 1, further comprising:
    providing via a user interface associated with the vehicle, information indicating to a vehicle occupant that the unsupervised autonomous driving mode is available for activation.

5. The method according to claim 4, further comprising: activating the unsupervised autonomous driving mode, when receiving selection.

6. The method according to claim 1, further comprising:
    activating the unsupervised autonomous driving mode, when receiving selection data indicating selection of the unsupervised autonomous driving mode.

7. The method according to claim 1, further comprising:
    determining that the vehicle is in a manual driving mode; and
    providing, via a user interface associated with the vehicle, information inviting a vehicle occupant to activate a supervised driving mode of the ADS.

8. The method according to claim 4, further comprising:
    activating a supervised driving mode of the ADS, when receiving selection data indicating selection thereof.

9. A driving mode transitioning system for supporting transitioning to an unsupervised autonomous driving mode of an Automated Driving System, ADS, of a vehicle, the driving mode transitioning system comprising:
    a vehicle situational data obtaining unit configured to obtain vehicle situational data indicating a state of vehicle surroundings along with position and heading of the vehicle;
    an unsupervised compliance determining unit configured to determine based on the obtained vehicle situational data, that unsupervised driving conditions of an unsupervised driving mode-related driving policy pertinent an unsupervised autonomous driving mode of the ADS, are complied with;
    a supervised mode determining unit configured to determine that the ADS has active a supervised driving mode governed by a supervised driving mode-related driving policy;
    an unsupervised policy implementing unit configured to implement the unsupervised driving mode-related driving policy to govern the supervised driving mode, the implementing comprising switching from the supervised driving mode-related driving policy to the unsupervised driving mode-related driving policy, with the supervised driving mode remaining active; and
    an unsupervised mode enabling unit configured to enable the unsupervised autonomous driving mode to be activated for the ADS, when one or both of positioning and velocity of the vehicle has reached compliance with unsupervised dynamic driving conditions of the unsupervised driving mode-related driving policy.

10. The driving mode transitioning system according to claim 9, further comprising:
an unsupervised mode informing unit configured to provide via a user interface associated with the vehicle, information indicating to a vehicle occupant that the unsupervised autonomous driving mode is available for activation.

11. The driving mode transitioning system according to claim 9, further comprising:
an unsupervised mode activating unit configured to activate the unsupervised autonomous driving mode, when receiving selection data indicating selection of the unsupervised autonomous driving mode.

12. The driving mode transitioning system according to claim 9, further comprising:
an unsupervised mode informing unit configured to provide via a user interface associated with the vehicle, information indicating to a vehicle occupant that the unsupervised autonomous driving mode is available for activation.

13. The driving mode transitioning system according to claim 12, further comprising:
an unsupervised mode activating unit configured to activate the unsupervised autonomous driving mode, when receiving selection data indicating selection of the unsupervised autonomous driving mode.

14. The driving mode transitioning system according to claim 9, further comprising:
an unsupervised mode activating unit configured to activate the unsupervised autonomous driving mode, when receiving selection data indicating selection of the unsupervised autonomous driving mode.

15. The driving mode transitioning system according to claim 9, further comprising:
a manual mode determining unit configured to determine that the vehicle is in a manual driving mode; and
a supervised mode inviting unit configured to provide, via a user interface associated with the vehicle, information inviting a vehicle occupant to activate a supervised driving mode of the ADS.

16. The driving mode transitioning system according to claim 15, further comprising:
a supervised mode activating unit configured to activate a supervised driving mode of the ADS, when receiving selection data indicating selection thereof.

17. The driving mode transitioning system according to claim 9, wherein the driving mode transitioning system is comprised in a vehicle.

18. A computer storage medium storing a computer program containing computer program code that when executed causes one of a computer or a processor perform a method for supporting transitioning to an unsupervised autonomous driving mode of an Automated Driving System, ADS, of a vehicle, the method comprising:
obtaining vehicle situational data indicating a state of vehicle surroundings along with position and heading of the vehicle;
determining based on the obtained vehicle situational data, that unsupervised driving conditions of an unsupervised driving mode-related driving policy pertinent an unsupervised autonomous driving mode of the ADS, are complied with;
determining that the ADS has active a supervised driving mode governed by a supervised driving mode-related driving policy;
implementing the unsupervised driving mode-related driving policy to govern the supervised driving mode, the implementing comprising switching from the supervised driving mode-related driving policy to the unsupervised driving mode-related driving policy, with the supervised driving mode remaining active; and
enabling the unsupervised autonomous driving mode to be activated for the ADS, when one or both of positioning and velocity of the vehicle has reached compliance with unsupervised dynamic driving conditions of the unsupervised driving mode-related driving policy.

* * * * *